(12) United States Patent
Chiu et al.

(10) Patent No.: US 11,422,432 B2
(45) Date of Patent: Aug. 23, 2022

(54) LENS ASSEMBLY FOR A MOBILE DEVICE HAVING AN ADJUSTABLE DIAPHRAGM DEVICE

(71) Applicant: TDK TAIWAN CORP., Taoyuan (TW)

(72) Inventors: Chi-Wei Chiu, Taoyuan (TW); Yung-Yun Chen, Taoyuan (TW)

(73) Assignee: TDK Taiwan Corp., Taoyuan (TW)

( * ) Notice: Subject to any disclaimer, the term of this patent is extended or adjusted under 35 U.S.C. 154(b) by 47 days.

(21) Appl. No.: 16/904,970

(22) Filed: Jun. 18, 2020

(65) Prior Publication Data

US 2021/0397068 A1 Dec. 23, 2021

(51) Int. Cl.
*G03B 9/02* (2021.01)
*G02B 7/02* (2021.01)
*F03G 7/06* (2006.01)
*G03B 7/22* (2021.01)

(52) U.S. Cl.
CPC ............... *G03B 9/02* (2013.01); *F03G 7/065* (2013.01); *G02B 7/021* (2013.01); *G03B 7/22* (2013.01)

(58) Field of Classification Search
CPC ..................................................... G03B 9/04
See application file for complete search history.

(56) References Cited

U.S. PATENT DOCUMENTS 5,150,702 A * 9/1992 Miyanaga .......... A61B 1/00096
348/362
7,628,554 B2 * 12/2009 Wernersson ......... H04N 5/2254
396/463
(Continued)

FOREIGN PATENT DOCUMENTS

CN 102298244 A 12/2011
CN 207833193 U 9/2018
(Continued)

OTHER PUBLICATIONS

Chinese Office Action dated Jul. 27, 2021 for the corresponding Application No. 201910031514.6; pp. 1-7.

*Primary Examiner* — Leon W Rhodes, Jr.
(74) *Attorney, Agent, or Firm* — Muncy, Geissler, Olds & Lowe, P.C.

(57) ABSTRACT

A lens assembly for a mobile device includes an adjustable diaphragm device capable of being combined to a first lens unit, or between the first lens unit and a second lens unit. The adjustable diaphragm device includes a case having a light transmission hole being communicated with an inner space of the case, a diaphragm sheet with an aperture, and a driving mechanism disposed in the inner space of the case. The driving mechanism includes a driving member and a swing arm. One end of the swing arm is movably connected to the case and the opposite end thereof is fixedly connected to the diaphragm sheet. The driving member is movably connected to a position between two ends of the swing arm. The driving member is controlled by a control unit to move the swing arm and thus the diaphragm sheet, in order to control the amount of light.

7 Claims, 6 Drawing Sheets

(56) References Cited

U.S. PATENT DOCUMENTS

| | | | |
|---|---|---|---|
| 7,699,543 B2* | 4/2010 | Wernersson | G03B 9/10 |
| | | | 396/448 |
| 7,724,412 B2* | 5/2010 | Powell | G03B 9/02 |
| | | | 359/234 |
| 7,976,230 B2* | 7/2011 | Ryynanen | G03B 11/043 |
| | | | 396/463 |
| 8,246,258 B2* | 8/2012 | Hsu | G03B 9/36 |
| | | | 396/452 |
| 9,274,329 B2* | 3/2016 | Stephenson | G02B 26/00 |
| 10,412,313 B2* | 9/2019 | Park | G02B 7/04 |
| 10,739,666 B2* | 8/2020 | Hwang | G03B 11/043 |
| 2007/0098399 A1 | 5/2007 | Yasunaga | |
| 2009/0304378 A1* | 12/2009 | Okita | A61B 1/042 |
| | | | 396/508 |
| 2018/0341166 A1* | 11/2018 | Imai | G03B 9/10 |
| 2019/0018303 A1* | 1/2019 | Chiu | G03B 9/02 |
| 2019/0324349 A1* | 10/2019 | Iwato | G03B 9/06 |

FOREIGN PATENT DOCUMENTS

| | | | |
|---|---|---|---|
| JP | 2005128450 A | * | 5/2005 |
| JP | 2006284803 A | * | 10/2006 |

* cited by examiner

LENS ASSEMBLY FOR A MOBILE DEVICE HAVING AN ADJUSTABLE DIAPHRAGM DEVICE

BACKGROUND OF THE INVENTION

1. Field of the Invention

The present invention relates to a lens assembly for a mobile device having an adjustable diaphragm device to control an amount of light entering thereinto.

2. The Prior Arts

Most known smart mobile phones have the functions of taking pictures and video recording, so more and more consumers are accustomed to using the mobile phones instead of cameras to take pictures. In the case of smart mobile phones constantly innovating, the major mobile phone manufacturers are also constantly focusing on the features of their mobile phones equipped with high pixel, large aperture. However, few people know that the aperture of the mobile phone is a constant fixed aperture and cannot be reduced or enlarged as a general camera lens to control the amount of light entering. This is limited by the thinning of the mobile device, so that the aperture motor and the diaphragm blades commonly used in general cameras are difficult to directly apply to the mobile device due to their thickness.

Generally, the camera controls the scaling of the aperture by the aperture motor driving the movement of the diaphragm blades. However, since the size of the mobile phone is required to be thin and lightweight, it is obviously impossible to configure the aperture motor in the mobile phone. In addition, there are other related optical structures and components to be placed in the mobile phone, even not only the aperture motor require a certain amount of electricity, but also need to consider how to dissipate the heat generated by the motor and components. Due to these factors, it is necessary to increase the space for internal storage and heat dissipation of the mobile phone to solve the problem. However, this is contrary to the thin and light mainstream design of the smart mobile phone, so all of the smart mobile phones use a fixed aperture to make the lens structure simpler and save space for other component configurations.

In addition to the reasons of the large space occupied by the aperture motor and the relative large power consumption, the other reason of the limitation is the aperture structure of the lens. Take the common iris diaphragm as an example, iris diaphragm adjusts the size of the aperture through the diaphragm blades, when a shutter is pressed during use, the aperture is automatically scaled to the aperture size set by the user on the camera interface; the aperture blades are stacked one after another structurally, although the curved thin metal blades are thin, they still have a thickness, besides the lens combination of the lens itself, the lens will protrude over the outside of the phone, making it easy to scratch the lens, therefore, the aperture adjustment structure of the general camera cannot be realized on a smart mobile phone.

SUMMARY OF THE INVENTION

A main objective of the present invention is to provide a lens assembly for a mobile device having an adjustable diaphragm device, which provides adjustable aperture function without utilizing a set of diaphragm blades constituting the aperture structure and a motor for driving the diaphragm blades. The adjustable diaphragm device is able to be disposed in a mobile device having a single lens unit or a dual lens unit, so that the whole structure of the mobile device is simplified.

A lens assembly for a mobile device having an adjustable diaphragm device of the present invention comprises: a case having an inner space, wherein two opposite side walls of the case respectively have a light transmission hole through the inner space; a diaphragm sheet with an aperture having a diameter smaller than the light transmission hole; a driving mechanism disposed in the inner space of the case, the driving mechanism includes a control unit, a driving member and a swing arm, one end of the swing arm is movably connected to the case and an opposite end thereof is fixedly connected to the diaphragm sheet, the driving member is movably connected between the two ends of the swing arm, and the driving member is controlled to move by the control unit, thereby the swing arm is driven to control the movement of the diaphragm sheet to allow the aperture coincide or not coincide with the light transmission hole; and a first lens unit with a first light entrance hole; wherein the first lens unit is disposed at one side of the case so that an optical axis of the first light entrance hole and an optical axis of the light transmission hole correspond to each other.

The lens assembly of the present invention may further comprise: a second lens unit with a second light entrance hole, which is disposed on an opposite side of the case, with an optical axis corresponds to the optical axis of the light transmission hole.

In a preferred embodiment of the present invention, the swing arm is provided with a slot opening, one end of the driving member is slidably fitted with the slot opening by a pin, and the driving member deforms to drive the swing arm to swing while the pin slides in the slot opening.

In a preferred embodiment of the present invention, the control unit includes a base, a first moving member, a second moving member, a first terminal and a second terminal, wherein two ends of the first moving member are respectively connected to the base and the first terminal, two ends of the second moving member are respectively connected to the base and the second terminal, and an opposite end of the driving member is connected to the base; wherein when the first moving member is electrically heated to shrink, the base is pulled to move along a first direction, and the driving member moves the diaphragm sheet to the position where the aperture of the diaphragm coincides with the light transmission hole, and when the second moving member is electrically heated to shrink, the base is pulled to move along a second direction, and the driving member moves the diaphragm sheet to the position where the aperture of the diaphragm sheet does not coincide with the light transmission hole.

In a preferred embodiment of the present invention, the first moving member and the second moving member are made of shape memory alloy wires, wherein the shape memory alloy wire is deformed by a current to heat for shrinking its length, and recoveries to the original length before the deformation when no current is applied.

In a preferred embodiment of the present invention, an amount of heat is applied to the memory alloy wire due to a current applying to the shape memory alloy wire, thereby causing the memory alloy wire an amount of deformation.

In a preferred embodiment of the present invention, the amount of heat may be adjusted to control the amount of deformation of the shape memory alloy wire, so that the diaphragm sheet is driven by the driving member to control an area of the aperture to be coincided with the light transmission hole.

The adjustable diaphragm device of the present invention may be combined with a single lens unit or a dual lens unit to form a simple lens assembly suitable for a thin and light mobile device.

DETAILED DESCRIPTION OF THE PREFERRED EMBODIMENT

The embodiments of the present invention will be described in more detail below with reference to the drawings and the reference numerals, and may be implemented by those skilled in the art after studying this specification.

Figure 1:
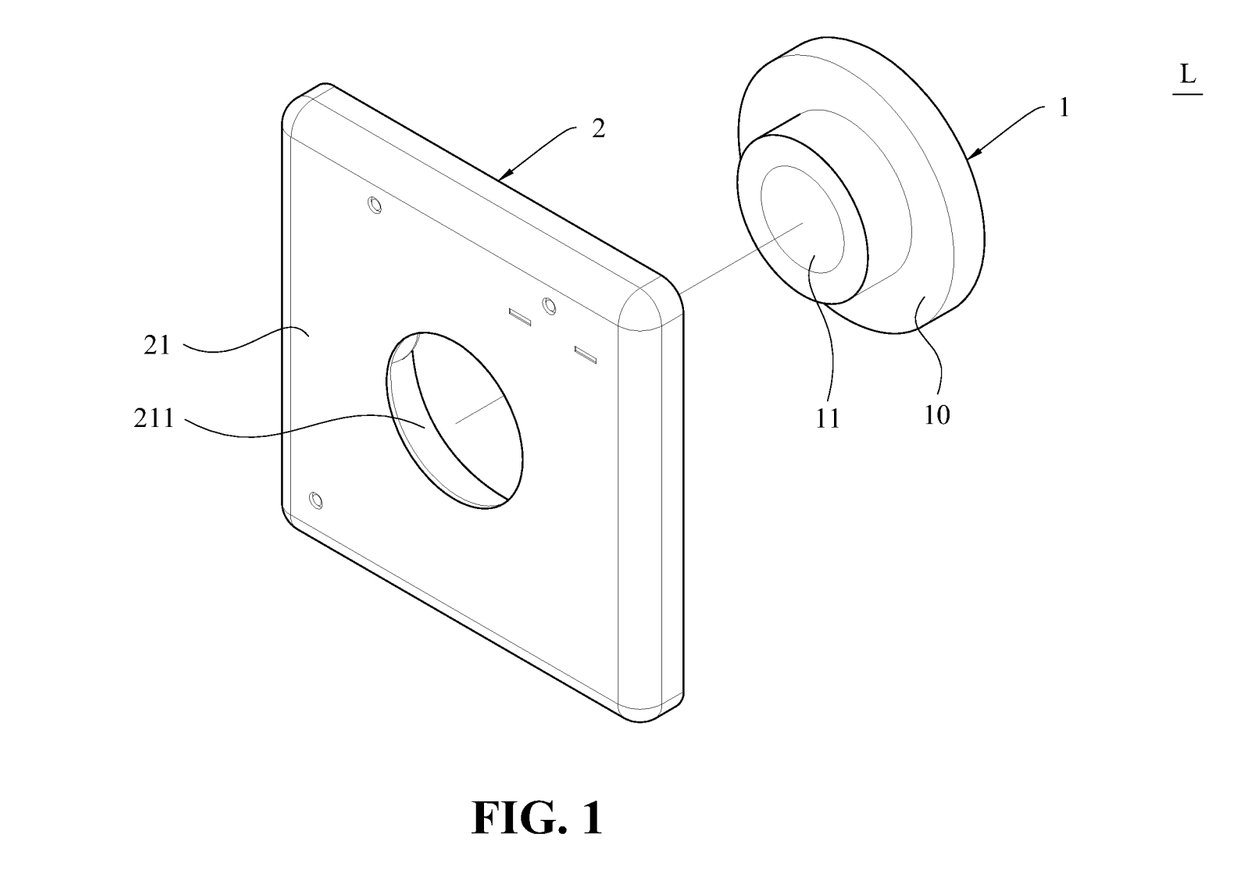
FIG. 1 is a perspective view of a first embodiment of the present invention.
Figure 2:
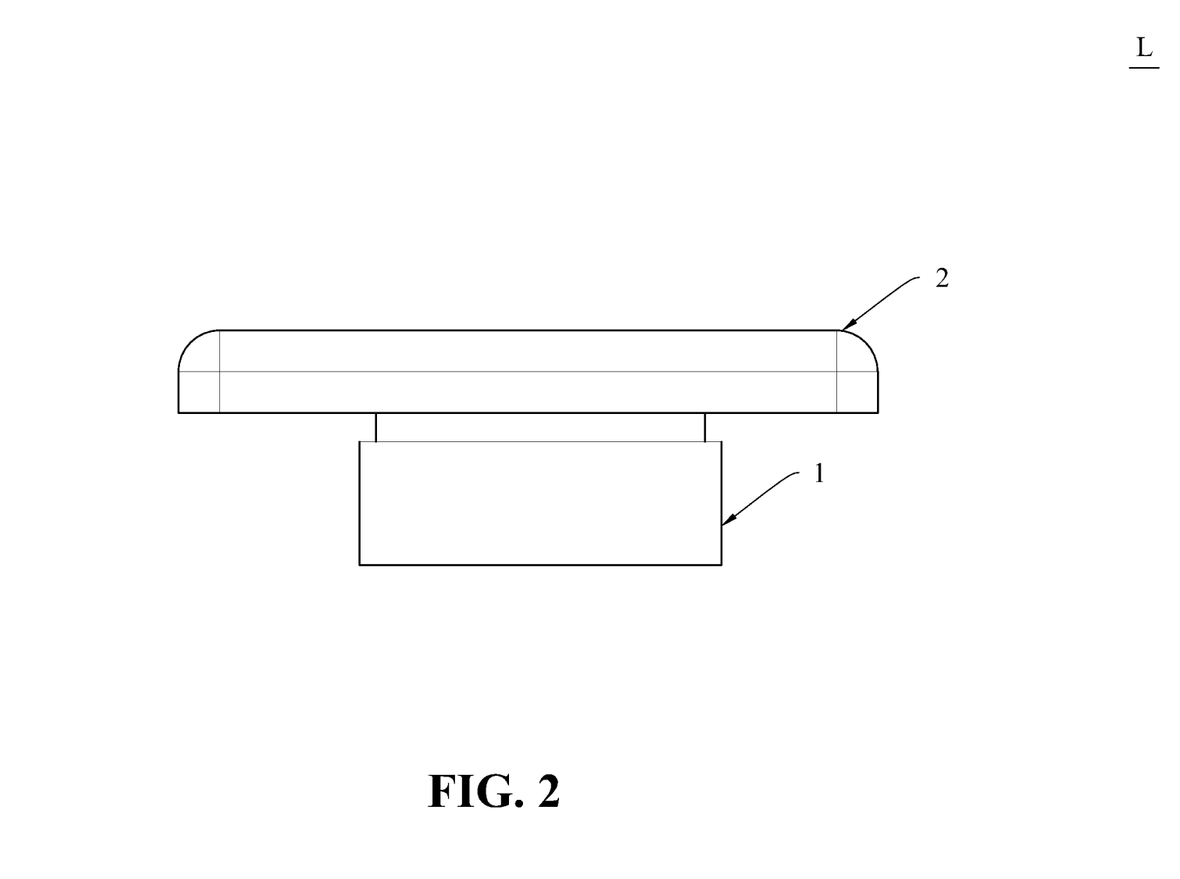
FIG. 2 is a schematic plan view of a first embodiment of the present invention.

FIG. 1 and FIG. 2 are a perspective view and a schematic plan view of a first embodiment of the present invention, respectively. As shown in FIG. 1 and FIG. 2, a lens assembly L for a mobile device having an adjustable diaphragm device of the present invention may comprise a first lens unit 1 and an adjustable diaphragm device 2; or may comprise a first lens unit 1, a second lens unit 3, and an adjustable diaphragm device 2 as shown in FIG. 3 and FIG. 4.

In the lens assembly L shown in FIG. 1 and FIG. 2, the first lens unit 1 and the adjustable diaphragm device 2 are installed in a mobile device (such as a mobile phone) in a form of combination. However, the entire lens assembly L does not need to be in the mobile device as a whole, a portion of the first lens unit 1 may be exposed to the outer surface of the mobile device, and the surface of the first lens unit 1 may also be aligned with or not protrude over the outer surface of the mobile device. For example, in the first embodiment shown in FIG. 1 and FIG. 2, the end of the first lens unit 1 is not protruded from the adjustable diaphragm device 2 when the first lens unit 1 and the adjustable iris device 2 combined each other. That is, when the lens assembly L is mounted on the mobile device, the end surface of the first lens unit 1 may be aligned with the outer surface of the mobile device, so that the appearance of the mobile device is better-looking.

In the first embodiment shown in FIG. 1 and FIG. 2, the first lens unit 1 is configured with a first body 10 and a first lens system (not shown), wherein the first body 10 has a first light entrance hole 11 for passing through a light, and the first lens system composed of a plurality of lenses is disposed in the first body 10. Since the first lens system and structure inside the first lens unit 1 belong to the prior arts and thus are not the key point of the present invention, the description is omitted herein.

Figure 3:
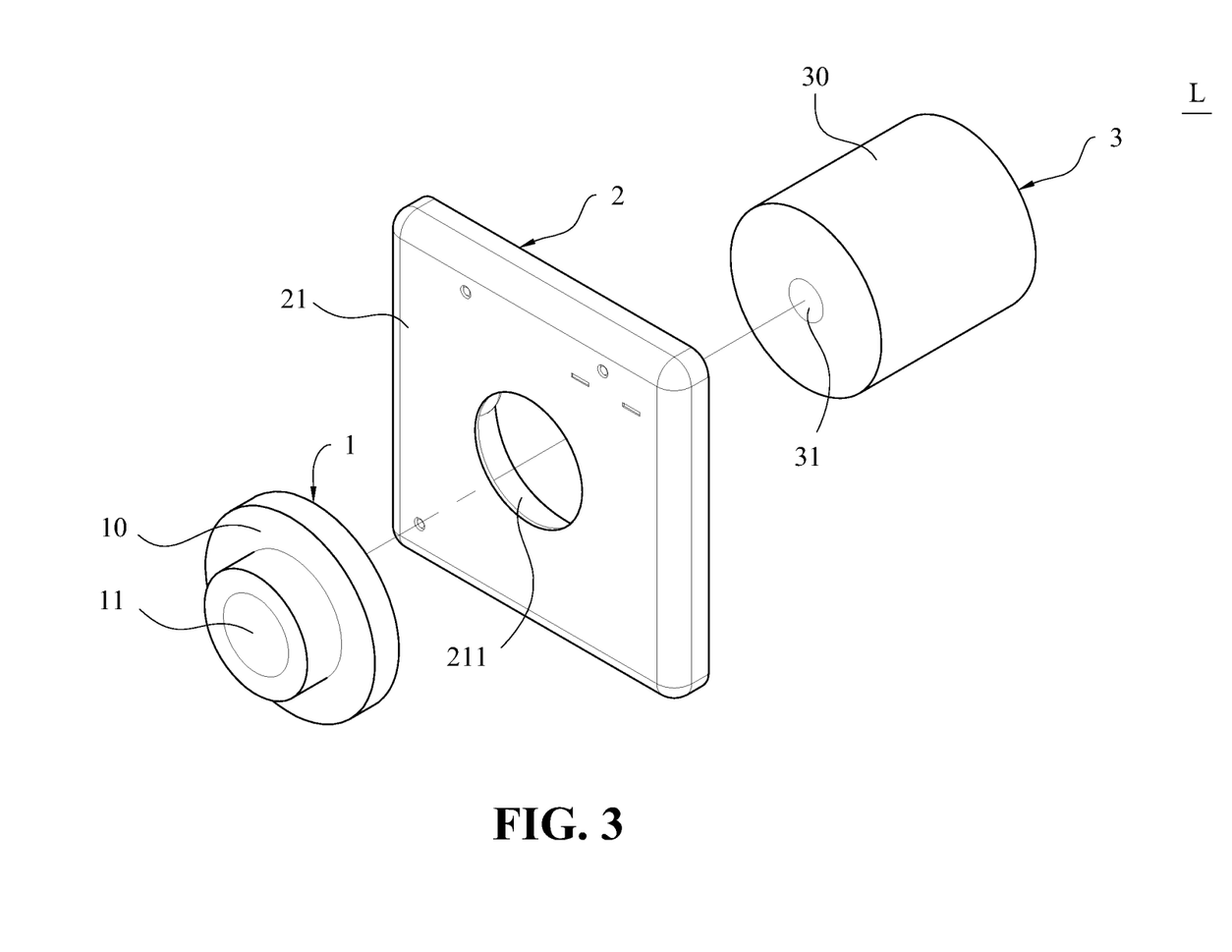
FIG. 3 is a perspective view of a second embodiment of the present invention.
Figure 4:
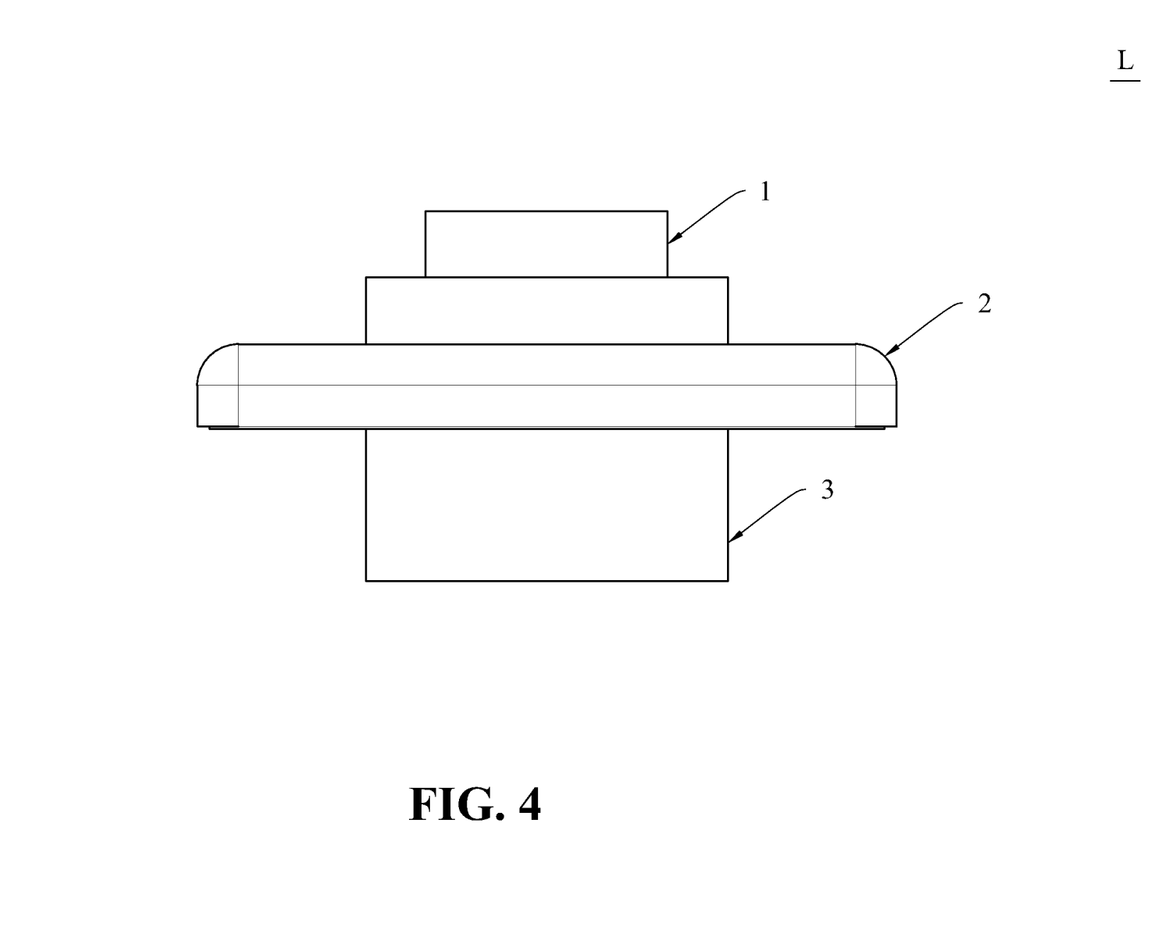
FIG. 4 is a schematic plan view of a first embodiment of the present invention.

In the lens assembly L shown in FIG. 3 and FIG. 4, a first lens unit 1, a second lens unit 3, and an adjustable diaphragm device 2 are combined and then installed in a mobile device (for example, a mobile phone), wherein the first lens unit 1 is located on one side of the adjustable diaphragm device 2 in the axial direction, and the second lens unit 3 is located on the opposite side of the adjustable diaphragm device 2. In this embodiment, since the adjustable diaphragm device 2 is disposed between the first lens unit 1 and the second lens unit 3 to form a sandwich structure, so that the lens assembly L has a better optical performance and has not a larger thickness as a whole.

In the second embodiment shown in FIG. 3 and FIG. 4, the first lens unit 1 comprises a first body 10 having a first light entrance hole 11 for a light to pass through, and a first lens system (not shown) composed of a plurality of lenses and disposed in the first body 10. A second lens unit 3 comprises a second body 30 having a second light entrance hole 31 for a light to pass through, and a second lens system (not shown) composed of a plurality of lenses and disposed in the second body 30. Since the lens system and structure inside the first lens unit 1 and the second lens unit 3 belong to the prior art and are not the key point of the present invention, the description is omitted herein.

Figure 5:
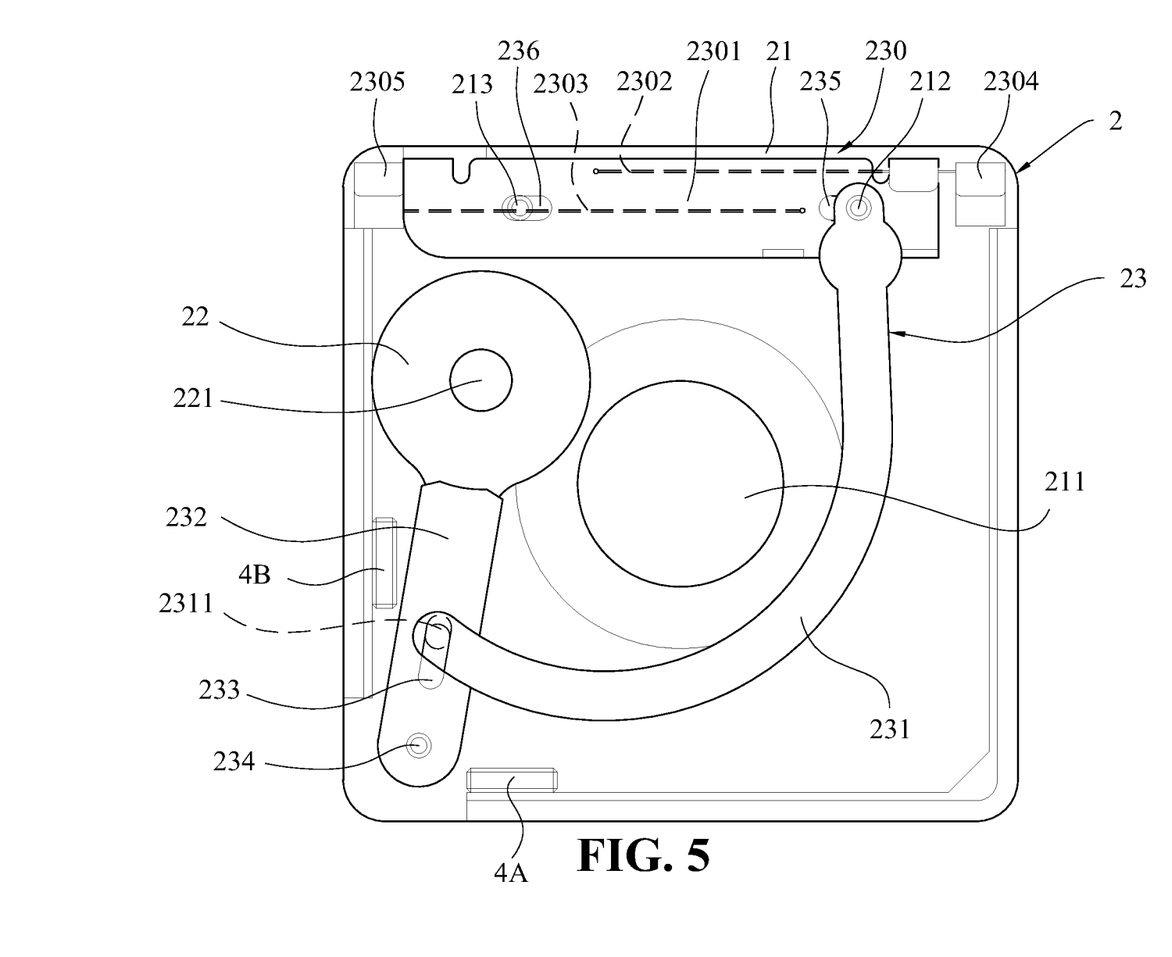
FIG. 5 is a schematic plan view showing the structure of the adjustable diaphragm device of the present invention, and showing that the diaphragm sheet does not shield the light transmission hole.

FIG. 5 is a schematic plan view showing the structure of the adjustable diaphragm device 2 included in the foregoing lens assembly L of the first embodiment and the second embodiment of the present invention. The adjustable diaphragm device may include a case 21, a diaphragm sheet 22, and a driving mechanism 23. The case 21 has an inner space, and a light transmission hole 211 respectively formed on two opposite side walls of the case 21, which are corresponding to each other and communicating with the inner space. A first protrusion shaft 212 and a second protrusion shaft 213 are formed to vertically protrude from two sides of the upper portion of the case 21.

The diaphragm sheet 22 is preferably formed with a sheet having a circular outer contour and a suitable thickness. The diaphragm sheet 22 is made of a non-transparent material, and an aperture 221 for a light to pass through is formed in the center of the circular diaphragm sheet 22. The diameter of the aperture 221 is smaller than the diameter of the light transmission hole 211 of the case 21.

The driving mechanism 23 is disposed in the inner space of the case 21; specifically, the driving mechanism 23 has a control unit 230, a driving member 231, and a swing arm 232. One end of the swing arm 232 is pivotally connected to the case 21 by a pivot 234 and the other end is fixedly connected to the diaphragm sheet 22, so that the diaphragm sheet 22 fixed to the swing arm 232 can swing freely. That is, the swing arm 232 and the diaphragm sheet 22 are combined to form a fan-like shape. Further, a slot opening 233 is provided between both ends of the swing arm 232.

The swing arm 232 is preferably made of a metal material having magnetic properties, and a first magnet 4A and a second magnet 4B are respectively disposed at a first position and a second position on the two adjacent inner walls of the case 21 in two directions which the swing arm 232 swings back and forth. The two adjacent inner walls are on two opposite sides of the swing arm 232 perpendicular to each other or form an angle. When the swing arm 232 swings to the first position, it may be attracted by the first magnet 4A to be positioned, and when the swing arm 232 swings to the second position in the opposite direction, it can be attracted by the second magnet 4B to be positioned.

The control unit 230 may include a base 2301, a first moving member 2302, a second moving member 2303, a first terminal 2304, and a second terminal 2305. The first and second terminals 2304 and 2305 having conductivity are respectively disposed at two ends of the case 21 and directly or indirectly electrically connected to a power source through wires. Preferably, the first and second moving members 2302 and 2303 are made of shape memory alloy wires (SMA), the shape memory alloy wire has a characteristic that a deformation can be caused and the length is shrunk when the power is on, and recoveries to the original length before the deformation when the power is off. In the present invention, the shape memory alloy wires of the first moving member 2302 and the second moving member 2303 are designed to cause a predetermined amount of deformation after being heated by electricity.

Figure 6:
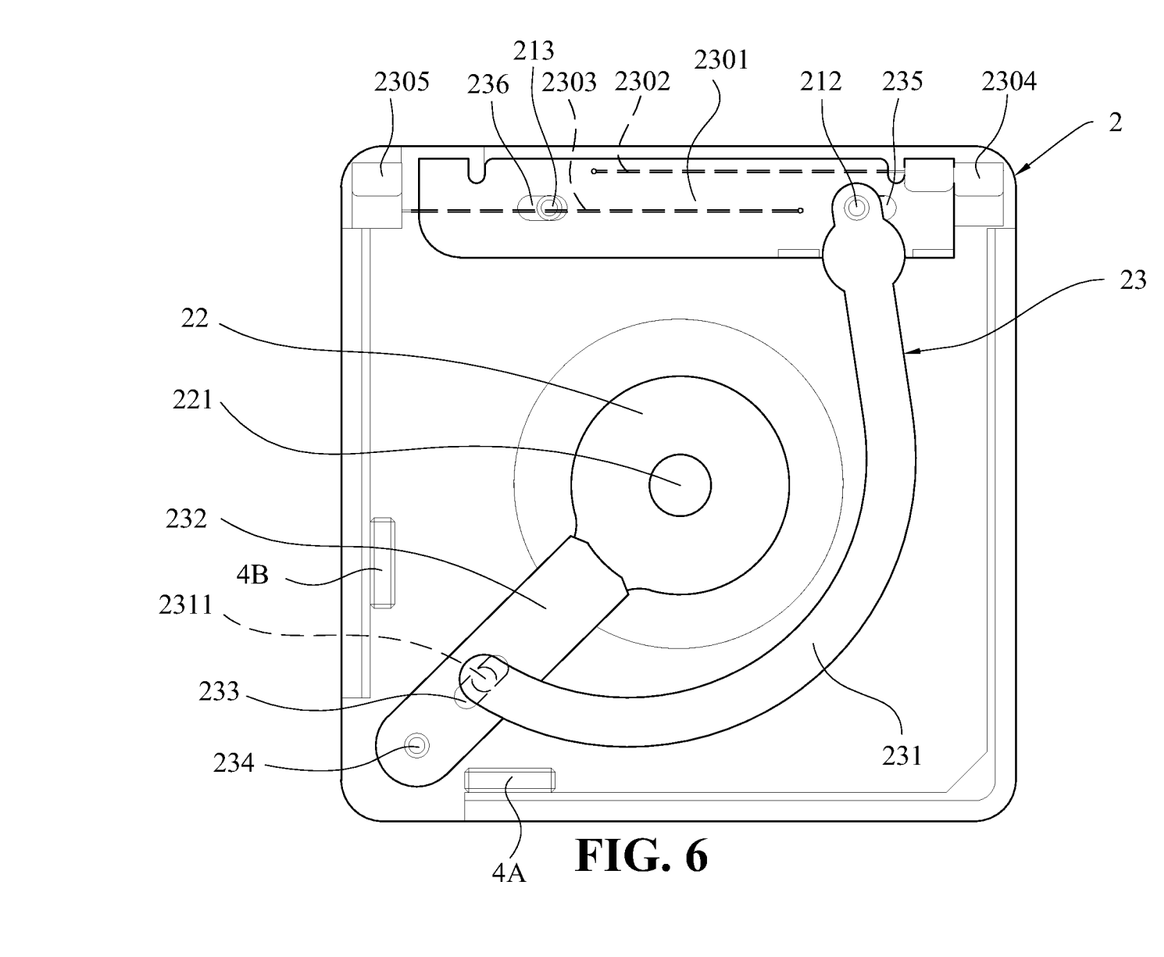
FIG. 6 is a schematic plan view showing the structure of the adjustable diaphragm device of the present invention, and showing that the diaphragm sheet shields the light transmission hole.

In the present invention, a first sliding groove 235 and a second sliding groove 236 are respectively disposed on two sides of the base 2301, and the first sliding grooves 235 and the second sliding grooves 236 are slidably fitted with the first protrusion shaft 212 and the second protrusion shafts 213 of the case 21, respectively; that is, the first protrusion shaft 212 and the second protrusion shafts 213 shown in FIG. 5 may slide left and right in the first sliding grooves 235 and the second sliding grooves 236, respectively. Moreover, in the present invention, the two ends of the first moving member 2302 are fixedly connected to the base 2301 and the first terminal 2304 respectively, and the two ends of the second moving member 2303 are fixedly connected to the base 2301 and the second terminal 2305 respectively. One end of the driving member 231 is slidably fitted with the slot opening 233 of the swing arm 232 by a pin 2311 and the other end thereof is rotatably coupled to the first protrusion shaft 212. When the length of the first moving member 2302 is controlled to be shrunk, the base 2301 may be pulled to move along a sliding rail in the first direction toward the first terminal 2304. Therefore, the base 2301 is driven to move the driving member 231, and the swing arm 232 is to be swung to the first position by the driving member 231 to make the aperture 221 of the diaphragm sheet 22 coincide with the light transmission hole 211 (as shown in FIG. 6). In this state, the swing arm 232 is attracted and positioned by the first magnet 4A to avoid the diaphragm sheet 22 moving freely. When the length of the second moving member 2303 is controlled to be shrunk, the base 2301 may be pulled to move along the sliding rail in the second direction toward the second terminal 2305. Therefore, after the magnetic force of the first magnet 4A on the swing arm 232 is overcome, the base 2301 is driven to move the driving member 231, and the swing arm 232 is to be swung to the second position by the driving member 231 to make the aperture 221 of the diaphragm sheet 22 not coincide with the light transmission hole 211 (as shown in FIG. 5). In this state, the swing arm 232 is attracted and positioned by the second magnet 4B to avoid the diaphragm sheet 22 moving freely. Similarly, if the swing arm 232 swings toward the direction of the first position in this state, the pulling force must also overcome the magnetic attraction of the second magnet 4B applied to the swing arm 232. When the aperture 221 coincides with the light transmission hole 211, the light transmission hole 211 is shielded by the diaphragm sheet 22 partially, and the light passes through a smaller diameter of the aperture 221 to obtain less amount of light input. When the aperture 221 does not coincide with the light transmission hole 211, the light directly passes through a large diameter of the light transmission hole 211 to obtain more amount of light input.

In the foregoing first embodiment of the present invention, since the optical axis of the first light entrance hole 11 and the optical axis of the light transmission hole 211 of the case 21 correspond to each other in the state that the first lens unit 1 is combined with the adjustable diaphragm device 2. When the aperture 221 of the adjustable diaphragm device 2 is controlled to coincide with the aperture 211, the light passes through the aperture 221 having a smaller diameter to allow less light passing through the first light entrance hole 11. When the aperture 221 does not coincide with the light transmission hole 211, the light directly passes through the transmission hole 211 having a larger diameter to allow more light passing through the first light entrance hole 11. It should be noted that the driving member 231 is a single piece arc shaped member to avoid overlapping with the diaphragm sheet 22 or blocking the light transmission hole 211 when the swing arm 232 swings to the first or second position.

In the second embodiment of the present invention, since the optical axis of the first light entrance hole 11, the optical axis of the second light entrance hole 31 and the optical axis of the light transmission hole 211 of the case 21 correspond to each other in the state that the first lens unit 1, the second lens unit 3 and the adjustable diaphragm device 2 are combined. When the aperture 221 of the adjustable diaphragm device 2 is controlled to coincide with the aperture 211, the light passes through the aperture 221 having a smaller diameter to allow less light passing through the first light entrance hole 11 and the second light entrance hole 31. When the aperture 221 does not coincide with the light transmission hole 211, the light directly passes through the transmission hole 211 having a larger diameter to allow more light passing through the first light entrance hole 11 and the second light entrance hole 31.

The above is only a preferred embodiment for explaining the present invention, and is not intended to impose any form limitation on the present invention. Therefore, any modification or alteration of the present invention made in the spirit of the same invention should still be included in the scope of the present invention.

What is claimed is:

1. A lens assembly for a mobile device having an adjustable diaphragm device, comprising:
   the adjustable diaphragm device, including:
      a case having an inner space, wherein a light transmission hole is respectively formed on two opposite side walls of the case, which are corresponding to each other and communicating with the inner space;
      a diaphragm sheet with an aperture, which has a diameter smaller than the light transmission hole; and
      a driving mechanism disposed in the inner space of the case, and including a control unit, a driving member, and a swing arm, wherein one end of the swing arm is movably connected to the case and an opposite end thereof is fixedly connected to the diaphragm sheet, the driving member is movably connected to a position between the two ends of the swing arm, and the driving member is controlled to move by the control unit, and the swing arm with the diaphragm sheet is to be swung by the driving member to make the aperture coincide or not coincide with the light transmission hole; and a first lens unit with a first light entrance hole which is disposed at one side of the case so that an optical axis of the first light entrance hole and an optical axis of the light transmission hole correspond to each other;

wherein the driving member is a single piece arc shaped member located on one side of the diaphragm sheet to avoid overlapping with the diaphragm sheet when the diaphragm sheet swings with the swing arm;

wherein the swing arm has magnetic properties, and a first magnet and a second magnet are disposed on a first position and a second position respectively of two adjacent inner side walls of the case, the two adjacent inner side walls are perpendicular to each other or form an angle so that the first and second magnets are located on two opposite sides of the swing arm to attract and position the swing arm towards the first and second positions when the swing arm swings back and forth in two opposite direction.

2. The lens assembly for the mobile device according to claim 1, further comprising a second lens unit with a second light entrance hole which is disposed on an opposite side of the case so that an optical axis of the second light entrance aperture and the optical axis of the light transmission hole correspond to each other.

3. The lens assembly for the mobile device according to claim 1, wherein the swing arm is provided with a slot opening, one end of the driving member is slidably fitted with the slot opening by a pin, and the driving member is moved by the control unit to drive the swing arm to swing while the pin slides in the slot opening.

4. The lens assembly for the mobile device according to claim 3, wherein the control unit includes a base, a first moving member, a second moving member, a first terminal, and a second terminal, and wherein two ends of the first moving member are respectively connected to the base and the first terminal, two ends of the second moving member are respectively connected to the base and the second terminal, and an opposite end of the driving member is connected to the base, when a length of the first moving member is controlled to be shrunk, the base is driven in a first direction to move the driving member and control the aperture of the diaphragm sheet to coincide with the light transmission hole, when a length of the second moving member is controlled to be shrunk, the base is driven in a second direction to move the driving member and control the aperture of the diaphragm sheet not to coincide with the light transmission hole.

5. The lens assembly for the mobile device according to claim 4, wherein the first moving member and the second moving member are made of shape memory alloy wires, and the shape memory alloy wires are deformed by a current for shrinking their length, and recover to an original length before the deformation when no current is applied.

6. The lens assembly for the mobile device according to claim 5, wherein an amount of heat is applied to the shape memory alloy wire due to a current applying to the shape memory alloy wire, thereby causing the shape memory alloy wire an amount of deformation.

7. The lens assembly for the mobile device according to claim 6, wherein the amount of heat is capable of being adjusted to control the amount of deformation of the shape memory alloy wire, so that the diaphragm sheet is driven by the driving member to control an area of the aperture be coincided with the light transmission hole.

* * * * *